Jan. 11, 1966　　　R. E. JACOBSON　　　3,228,455
PROJECTION SCREEN
Filed Dec. 31, 1963　　　　　　　　　　　　　　4 Sheets-Sheet 1
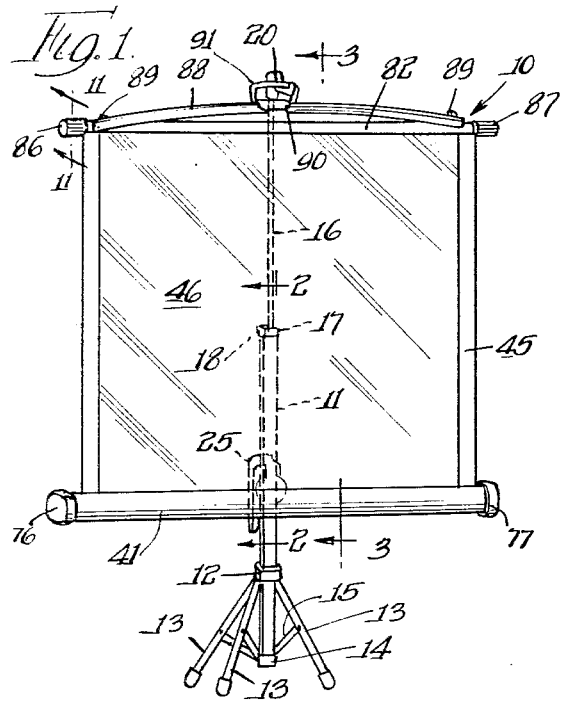
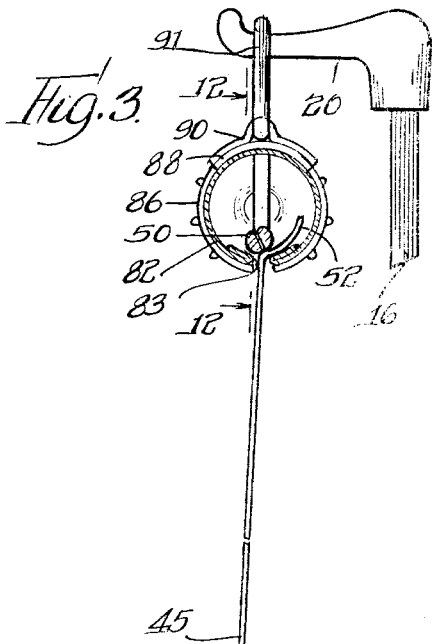
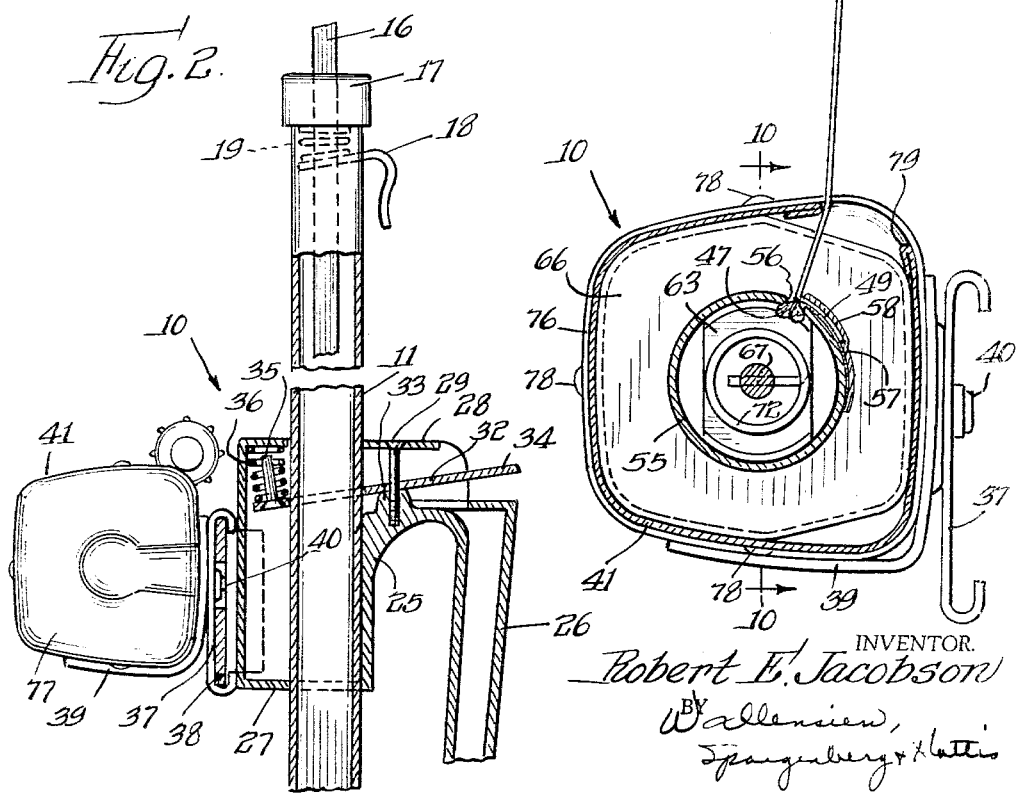
INVENTOR.
Robert E. Jacobson

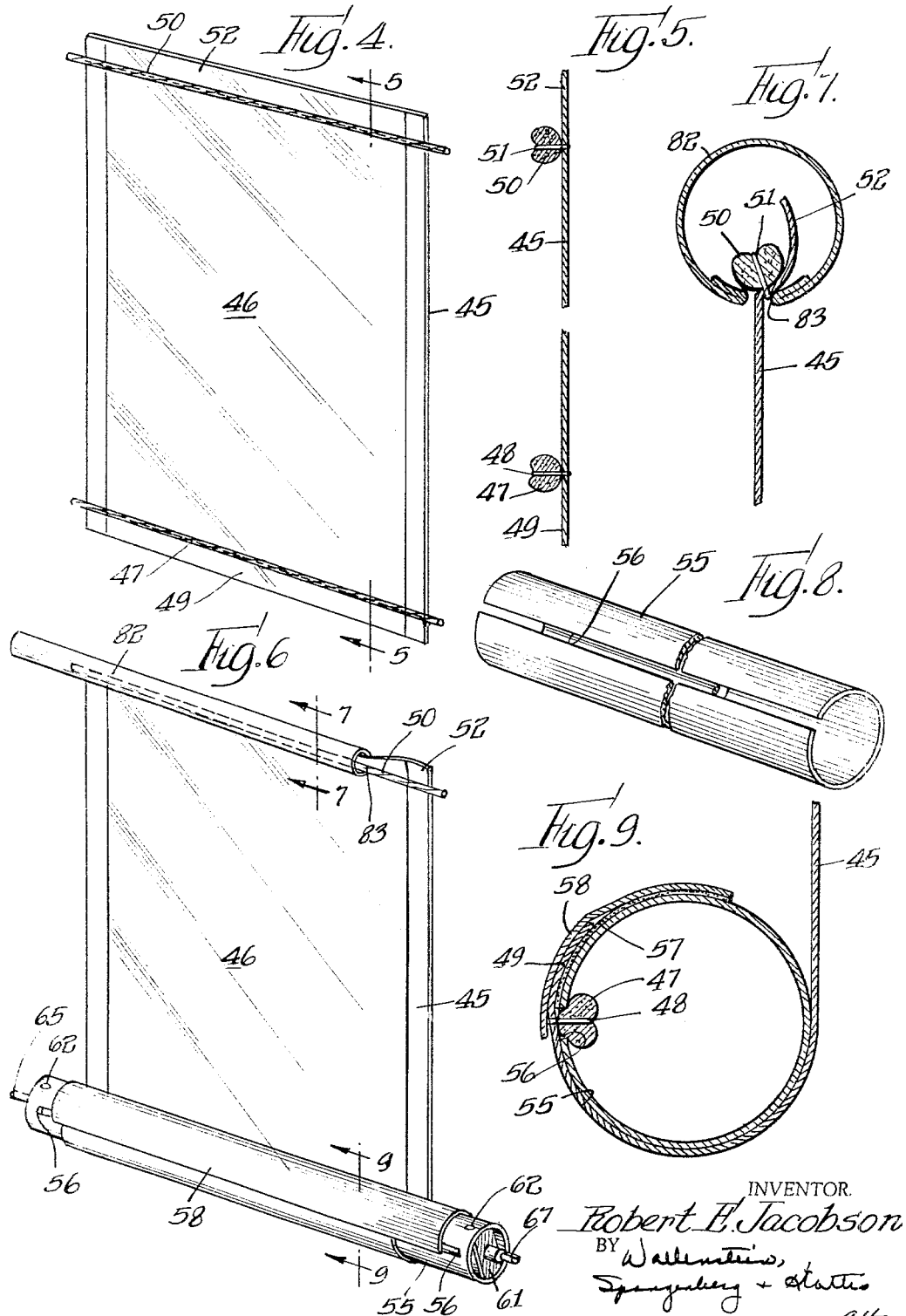

Jan. 11, 1966 R. E. JACOBSON 3,228,455
PROJECTION SCREEN
Filed Dec. 31, 1963 4 Sheets-Sheet 3

INVENTOR.
Robert E. Jacobson
BY Wallenstein,
Spangenberg & Hattis
Attys.

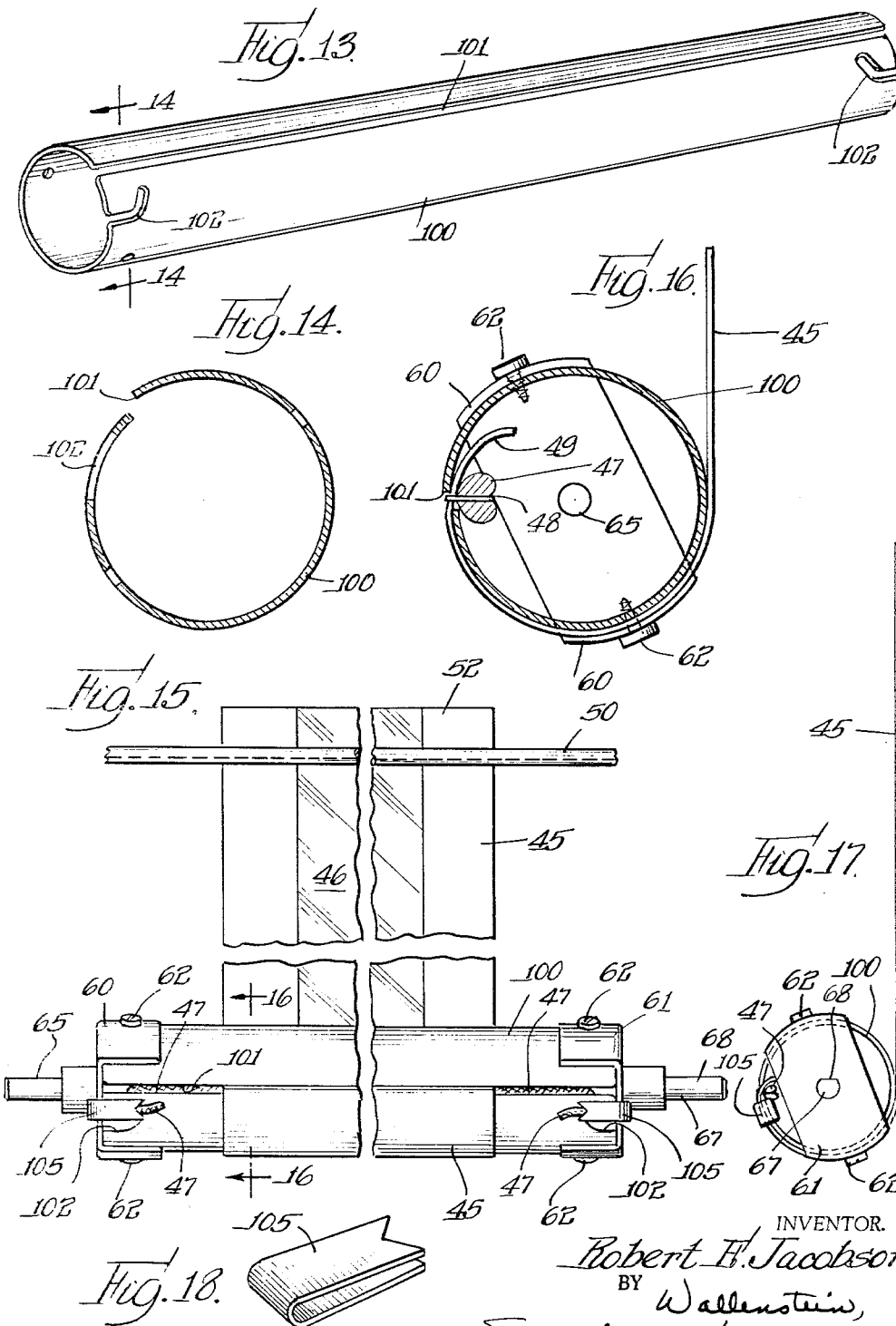

3,228,455
PROJECTION SCREEN

Robert E. Jacobson, Elk Grove Village, Ill., assignor to Radiant Manufacturing Corporation, Morton Grove, Ill., a corporation of Illinois
Filed Dec. 31, 1963, Ser. No. 337,974
12 Claims. (Cl. 160—24)

This application is a continuation-in-part of my copending application Serial No. 248,344, filed December 31, 1962.

This invention is directed to a projection screen for exhibiting pictures projected thereon of the type which has a flexible screen secured at one end to a spring actuated roller upon which the flexible screen is normally rolled and at its opposite end to a suspension slat by which it is unrolled from the roller to picture exhibiting position, and which may also have means for tensioning the flexible screen in picture exhibiting position.

In projection screens of this type a number of problems have arisen having to do with, for example, firmly securing the flexible screen to the roller and the suspension slot, preventing the formation of wrinkles or waves in the flexible screen when in picture exhibiting position, preventing the forming of lattice formations in the flexible screen when rolled on the roller which become apparent when the flexible screen is unrolled to picture exhibiting position, and uniformly tensioning the flexible screen in its picture exhibiting position. Various attempts have been made to solve these important problems, but on the whole, they have not been entirely successful and they have resulted in relatively expensive projection screen constructions.

The principal object of this invention is to provide an improved projection screen of the aforementioned type which solves the aforementioned problems in an efficient and simple manner and also in an inexpensive manner.

Briefly, the projection screen of this invention includes a flexible screen of rectangular outline, a first rope stitched to one side of the flexible screen adjacent to but spaced from one edge of the flexible screen, and a second rope stitched to the same side of the flexible screen adjacent to but spaced from an edge of the flexible screen opposite from said one edge, said stitched ropes being parallel to each other. These two ropes are preferably simultaneously stitched to the flexible screen by a double headed sewing machine so that the stitching is straight and uniform and so that the stitched ropes are substantially absolutely parallel.

A tubular roller, having a longitudinally extending slot therein of lesser width than the thickness of the first stitched rope, longitudinally receives the first stitched rope along the slot therein for anchoring that end of the flexible screen to the tubular roller. A tubular suspension slat, having a longitudinally extending slot therein of lesser width than the thickness of the second stitched rope, longitudinally receives the second stitched rope along the slot therein for anchoring that end of the flexible screen to the tubular suspension slat. As a result, the tubular roller and the tubular suspension slat are anchored to the opposite ends of the flexible screen in substantially absolutely parallel relation in an extremely efficient, simple and inexpensive manner.

Spring means are provided for the tubular roller for rotating the same for normally rolling the flexible screen onto the tubular roller, and the tubular suspension slat operates to unroll the flexible screen from the roller against the action of the spring means. Mounting means are provided for the tubular roller and the tubular suspension slat for supporting the flexible screen in picture exhibiting position, the flexible screen being in picture exhibiting position when it is completely unrolled from the roller.

The mounting means may also include means for moving apart the tubular roller and the tubular suspension slat to tension the flexible screen in picture exhibiting position between said first and second stitched ropes.

Since the stitching of the ropes to the flexible screen is straight and uniform, and since there is a substantially absolutely parallel relationship between the stitched ropes and between the tubular roller and tubular suspension slat anchored by the stitched ropes, the flexible screen hangs flat in picture exhibiting position without wrinkles or waves therein and the flexible screen is uniformly tensioned throughout its width, the stitched ropes forming rugged as well as accurate and inexpensive anchoring means between the flexible screen and the tubular roller and tubular suspension slat which efficiently withstand the tensioning forces applied to the flexible screen.

In accordance with one form of this invention, the first stitched rope is longitudinally received in the tubular roller along the slot therein with the flexible screen and the projecting edge thereof beyond the stitched rope on the outside of the tubular roller for anchoring that end of the flexible screen to the tubular roller, and adhesive means are utilized for securing the projecting edge of the flexible screen beyond the stitched rope to the outside of the tubular roller. In this latter respect, a double faced adhesive tape of greater width than the width of the projecting edge of the flexible screen beyond the stitched rope is secured on its inside to the outside of the tubular roller along the tubular slot therein, and the projecting edge of the flexible screen beyond the stitched rope is secured to the outside of the double faced adhesive tape and hence to the outside of the tubular roller. Also, a protective film is secured to the outside of the double faced adhesive tape and overlies the double faced adhesive tape, the projecting edge of the flexible screen and the stitching of the rope to the flexible screen. This adhesive means prevents longitudinal movement of the flexible screen with respect to the tubular roller and, also presents a relatively smooth cylindrical surface upon which the flexible screen is rolled so that lattice formations are not formed in the flexible screen while rolled on the tubular roller, which does occur if the cylindrical surface is not substantially smooth.

In accordance with another form of this invention, the edges of the longitudinal slot in the tubular roller are radially offset a distance corresponding substantially to the thickness of the flexible screen, and the first stitched rope and the projecting edge of the flexible screen beyond that stitched rope are longitudinally received in the tubular roller along the slot therein with the flexible screen extending through the slot therein for anchoring that end of the flexible screen to the tubular roller. The flexible screen cooperates with the slot in the tubular roller through which it extends to present a relatively smooth cylindrical surface upon which the flexible screen is rolled so that lattice formations are not formed in the flexible screen while rolled on the tubular roller. The ends of the tubular roller are preferably provided with bayonet type slots for receiving the extending ends of the first stitched rope, and spring clips on the ends of the tubular roller to clamp the extending ends of the first stitched rope in the bayonet type slots for stretching and positioning the first stitched rope and the flexible screen along the tubular roller and for preventing relative longitudinal movement therebetween.

In both forms of the invention, the second stitched rope and the projecting edge of the flexible screen beyond that stitched rope are longitudinally received in the tubular suspension slat along the slot therein with the flexible screen extending through the slot therein for anchoring that end of the flexible screen to the tubular suspension slat, this providing an extremely neat appearance in addition to a rugged, accurate and inexpensive anchoring means. Also, means, which are secured to the ends of the tubular suspension slat and the ends of the second stitched rope, are provided for stretching and positioning the second stitched rope and the flexible screen along the tubular suspension slat and preventing relative longitudinal movement therebetween.

Further objects and advantages of this invention reside in the details of construction of the projection screen and in the cooperative relationships between the component parts thereof.

Other objects and advantages of this invention will become apparent to those skilled in the art upon reference to the accompanying specification, claims and drawings in which:

FIG. 1 is a perspective view illustrating one form of the projection screen of this invention in picture exhibiting position;

FIG. 2 is a vertical sectional view taken substantially along the line 2—2 of FIG. 1;

FIG. 3 is a vertical sectional view taken substantially along the line 3—3 of FIG. 1;

FIG. 4 is a perspective view of the flexible screen illustrating the first and second ropes stitched thereto;

FIG. 5 is a sectional view taken substantially along the line 5—5 of FIG. 4;

FIG. 6 is a view similar to FIG. 4 but showing the opposite ends of the flexible screen being anchored to the tubular roller and the tubular suspension slat;

FIG. 7 is a sectional view taken substantially along the line 7—7 of FIG. 6;

FIG. 8 is a perspective view of the tubular roller;

FIG. 9 is a vertical sectional view taken substantially along the line 9—9 of FIG. 6;

FIG. 13 is a perspective view of the tubular roller of another form of this invention;

FIG. 14 is a sectional view through the tubular roller of FIG. 13 taken substantially along the line 14—14 of FIG. 13;

FIG. 15 is an elevational view similar to the perspective view of FIG. 6 but illustrating the manner of securing the flexible screen to the tubular roller of FIG. 13;

FIG. 16 is a sectional view taken substantially along the line 16—16 of FIG. 15;

FIG. 17 is an end view of FIG. 15 looking from the right; and

FIG. 18 is a perspective view of the spring clips utilized in FIGS. 15 and 17.

Figure 10:
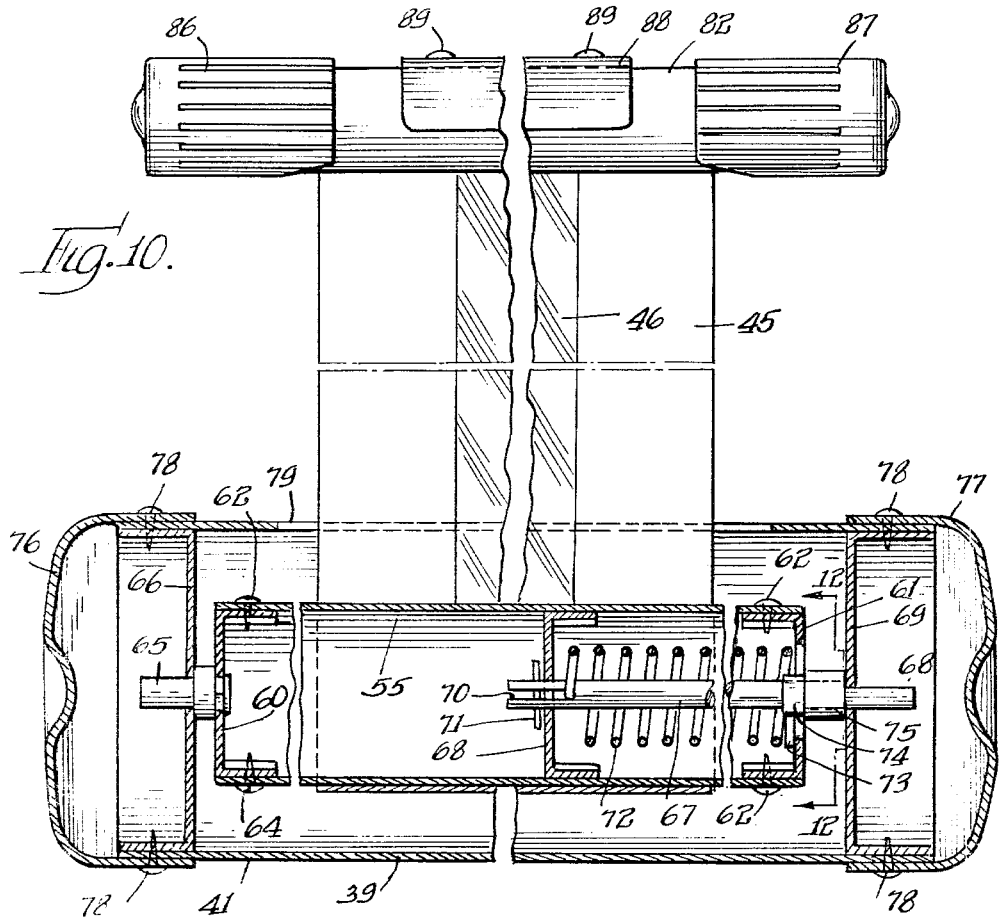
FIG. 10 is a sectional view taken substantially along the line 10—10 of FIG. 3.

Referring first to FIGS. 1 and 2, one form of the projection screen of this invention, wherein the flexible screen is vertically raised and lowered from a screen case by a suspension slat, is generally designated at 10. It includes a portable collapsible stand having an upright tube or post 11, which is preefrably non-circular in cross section. A bracket 12 is slidably carried on the upright tube 11 and a plurality of legs 13 are pivotally secured to the bracket 12. Fixed to the bottom of the upright tube 11 is a bracket 14 and links 15 are pivotally secured to the bracket 14 and to the legs 13. The legs 13 may be folded together for storage and transportation purposes and when this is done, the bracket 12 slides upwardly on the tube or post 11. Suitable latch means (not shown) may be provided for holding the legs 13 in collapsed position. When the legs 13 are extended for exhibiting purposes, as illustrated in FIG. 1, the bracket 12 slides downwardly on the upright post 11. In this way the supporting stand is maintained in an upright position.

An extension rod 16 is slidably mounted in the upright tube or post 11, the extension rod being guided for vertical movement by a collar (not shown) carried on the lower end of the extension rod and by a cap 17 secured to the upper end of the post 11. The extension rod 16 is maintained in any desired extended position by a nipping lever 18 extending through a suitable opening in the upright tube 11 and gripping the extension rod 16. The nipping lever 18 is resiliently urged into gripping position by means of a spring 19 and the action of the spring may be overcome by manually manipulating the nipping lever 18 to allow the desired adjustment of the position of the extension rod 16. The upper end of the extension rod is provided with a hook member 20. There is thus provided a hook member which is slidably adjustably carried by the post 11.

A hollow handle member 25 having a handle portion 26 and a bottom portion 27 is slidably carried on the upright tube or post 11, it being provided with a suitable opening for receiving the post 11. The handle member 25 is also provided with a cover 28 which is also provided with an opening for receiving the post 11. The cover 28 is secured to the handle member 25 by a screw 29 threaded into a boss 33 having a fulcrum or shoulder. Located within the hollow handle member 25 is a nipping lever 32 having an opening conforming to and receiving the post 11. This nippjing lever is also provided at one end with an extension 34 forming a manipulating finger which extends outwardly from the hollow handle member 25. The other end of the nipping lever 32 is provided with a spring seat 35 in the form of a post. The nipping lever 32 is fulcrumed on one side of the tube or post 11 and the shoulder 33 of the hollow handle member 25. Around the post 35 and extending between the cover 28 and the other side of the nipping lever 32 is a compression spring 36. This compression spring 36 operates to tilt the nipping lever 32 about the fulcrum 33 (in a counter-clockwise direction as illustrated) to cause the edges of the nipping lever to engage and grip the opposite sides of the post 11. In this position the nipping lever forcibly engages the post 11 and prevents relative movement therebetween in either direction. Movement of the handle member 25 upwardly with respect to the post 11 is prevented by the shoulder 33 engaging the nipping lever 32. It is noted that the post 35 extends in close proximity to but spaced from the cover 28 and the post 35 and the cover 28 operate as a stop means. When the handle member 25 is pushed downwardly, the spring still urges the nipping lever in a counter-clockwise direction and the post 35 engages the cover member 28 and prevents further downward movement of the handle member 25. Thus, with the nipping lever 32 in the position shown in FIG. 2 upward and downward movement of the handle member 25 with respect to the post 11 is prevented. When, however, the extension finger 34 of the nipping lever 32 is pressed downwardly the nipping lever is fulcrumed about the shoulder 33 in a clockwise direction against the action of the spring 36 to release the edges of the opening therein from the post 11, this being permitted by the normal spacing between the post 35 and the cover 28. When this is done, the handle member 25 may be freely moved upwardly and downwardly along the post 11 to any desired position. When the nipping lever 32 is released, it automatically grips the post 11 and locks the handle member 25 in the adjusted position on the post 11.

A bracket 37 is secured by a bracket 38 to the handle member 25 for pivotally supporting a screen case 41. In this connection the screen case 41 is suitably secured to a bracket 39 which in turn is pivoted by a pivot pin 40 to the bracket 37, the bracket 39 and the screen case 41 pivoting about the pivot 40. The screen case 41 is pivoted to a position parallel with the post 11 for storing and transportation purposes and is pivoted to a position at right angles to the post 11, as shown in FIG. 1, for picture exhibiting purposes.

Referring more particularly to FIGS. 4 to 9, the projection screen includes a flexible screen 45 having a reflecting surface 46. The surface 46 may be of the glass bead type or of the lenticular synthetic plastic type. A first rope 47 is stitched, as indicated at 48, to one side of the flexible screen 45 adjacent to but spaced from one edge thereof, the flexible screen projecting beyond the stitched rope 47 as indicated at 49. A second rope 50 is stitched as indicated at 51 to the same side of the flexible screen 45 adjacent to but spaced from an edge of the flexible screen opposite from the first edge, the flexible screen projecting beyond the second rope 50 as indicated at 52. The stitched ropes 47 and 50 are parallel to each other. These two ropes 47 and 50 are preferably simultaneously stitched, as indicated at 48 and 51, to the flexible screen 45 by a double headed sewing machine so that the stitching 48 and 51 is straight and uniform and so that the stitched ropes 47 and 50 are substantially absolutely parallel. The amount of overhang of the flexible screen beyond the first rope 47 may be substantially one-half inch and the amount of overhang beyond the second rope 50 may be substantially three-eighths inch. The distance between the first and second ropes 47 and 50 may be substantially forty and three-fourths inches for a forty-inch high screen size and substantially fifty and three-fourths inches for a fifty-inch high screen size. Thus it is seen that a minimum amount of flexible screen is utilized for a given screen size. Preferably, the stitched ropes 47 and 50 extend beyond the side edges of the flexible screen 45.

As expressed above one end of the flexible screen 45 having the first rope 47 stitched thereto is anchored to a tubular roller. In this connection reference is made to FIGS. 8 and 9 where the tubular roller is indicated at 55. This tubular roller 55 has a slot 56 extending longitudinally throughout the length thereof, the width of the slot 56 being less than the thickness of the first stitched rope 47. The tubular roller 55 longitudinally receives the first stitched rope 47 along the elongated slot 56 therein for anchoring that end of the flexible screen 45 to the tubular roller 55. When this is done, the flexible screen 45 and the projecting edge 49 thereof beyond the stitched rope 47 are arranged on the outside of the tubular roller with only the stitched rope 47 arranged on the inside of the tubular roller. A double faced adhesive tape 57 is adhesively secured on its inside to the outside of the tubular roller 55 along the slot 56 therein, the width of the double faced adhesive tape 57 being wider than the projecting edge 49 beyond the stitched rope 47. This projecting edge 49 is then secured on its inside to the outside of the double faced adhesive tape 57 and hence to the outside of the tubular roller 55. The double faced adhesive tape 57, which may have a width of substantially one inch, projects beyond the projecting edge 49 of the flexible screen 45 and, therefore, has an exteriorly exposed adhesive surface. A protective film 58, which may be in the form of a synthetic plastic tape, is secured to the outside of this projecting portion of the double faced adhesive tape 57 and this protecting film 58 overlies the double faced adhesive tape 57, the projecting edge 49 of the flexible screen and the stitching 48 of the first rope 47 to the flexible screen. Preferably, the double faced adhesive tape 57 and the protecting film 58 are of such lengths as to project beyond the sides of the flexible screen 45. This double faced adhesive tape 57, therefore, adhesively secures the projected edge 49 of the flexible screen 45 to the tubular roller 55 and prevents longitudinal movement of the flexible screen 45 with respect to the tubular roller 55 and it, in conjunction with the protective film 58, operates to present a relatively smooth cylindrical surface upon which the flexible screen 45 is wound so that lattice formations are not formed in the flexible screen 45 while wound on the tubular roller 55, which does occur if the cylindrical surface is not substantially smooth.

Figure 12:
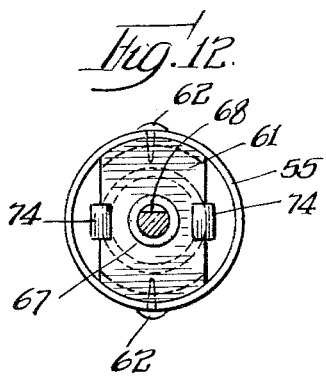
FIG. 12 is an end elevational view taken substantially along the line 12—12 of FIG. 10.

Referring now to FIGS. 3, 10 and 12, spiders 60 and 61 are secured by screws 62 to the inside of the tubular roller 55 and another spider 63 is arranged within the tubular roller 55 substantially adjacent to the center thereof. A pin 65 is rigidly secured to the spider 60, as by staking or the like, and it is rotatably mounted in a support 66 suitably secured to one end of the screen case 41. The spiders 61 and 63 are rotatably mounted on a shaft 67 which is provided at its outer end with a flat portion 68. The flatted end of the shaft 67 is secured against rotation in a support 69 also suitably secured to the screen case 41. Thus, the shaft 67, which is supported by the support 69, is held against rotation. The inner end of the shaft 67 is provided with a slot 70 and a pin 71 extends through the shaft 67 for positioning the shaft 67 with respect to the spider 63. One end of a coil spring 72 is received in the slot 70 in the shaft 67 for anchoring that end of the coil spring 72 against rotation. The other end of the coil spring 72 is secured to a spring retainer clip 73 which in turn is secured by tabs 74 to the spider 61, this other end of the spring 72, therefore, rotating with the tubular roller 55. A spacer 75 is staked to the shaft 67 and is arranged between the spider 61 and the support 69 for properly aligning longitudinally the tubular roller 55 with respect to the screen case 41. The spring 72 operates to rotate the tubular roller 55 in a direction to normally roll the flexible screen 45 onto the tubular roller 55. The ends of the screen case 41 are closed by suitable caps 76 and 77 which are secured to the screen case by screws 78. The screen case 41 is provided with a longitudinally extending slot 79 through which the flexible screen 45 may be unrolled from the tubular roller 55 against the action of the spring 72.

Figure 11:
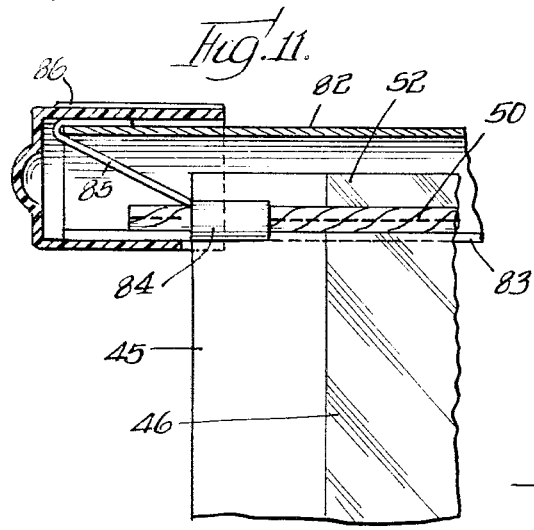
FIG. 11 is a sectional view taken substantially along the line 11—11 of FIG. 1.

As expressed above, the other end of the flexible screen 45 is anchored to a tubular suspension slat 82 having a longitudinally extending slot 83. Referring more particularly to FIGS. 6 and 7, the second stitched rope 50 and the projecting edge 52 of the flexible screen 45 are arranged within the tubular suspension slat 82 with the flexible screen 45 extending through the slot 83. Here, also, the width of the slot 83 is less than the thickness of the second stitched rope 50 so that this end of the flexible screen 45 is firmly anchored to the tubular suspension slat 82. Since the projecting edge 52 of the flexible screen 45 is arranged within the tubular suspension slat 82, a neat appearance is provided. As shown more clearly in FIG. 11, a clip or the like 84 is secured to each end of the stitched rope 50 and they are provided with fingers 85 which extend over the ends of the tubular suspension slat 82 for stretching and longitudinally positioning the second stitched rope 50 and the flexible screen 45 in the tubular suspension slat 82. Thus, longitudinal movement of the flexible screen 45 with respect to the tubular suspension slat 82 is prevented. The ends of the tubular suspension slat 82 are preferably closed by end caps 86 and 87.

A leaf spring 88 is secured at its ends to the suspension slat 82 by rivets or the like 89 and it is provided intermediate its ends with a bracket 90 which in turn carries a bail 91. The bail 91 is adapted to be placed over the hook member 20, as shown in FIGS. 1 and 3 for supporting the flexible screen 45 in picture exhibiting position. When the flexible screen 45 is completely unrolled from the roller by the suspension slat 82 and the bail 91 is placed over the hook member 20 and the handle member 25 is moved downwardly or the extension rod 16 is moved upwardly, the leaf spring 88 operates to place tension on the flexible screen 45 for tensioning the same in picture exhibiting position. The leaf spring 88 is utilized on larger sized screens for providing the appropriate tension. However, on the smaller sized screens the leaf spring 88 may be omitted and the bracket 90 for the bail 91 may be attached directly to the suspension slat 82. For these smaller sized screens sufficient tension may be placed on the flexible screen 45 without the use of the leaf spring 88.

Since the stitching of the first and second ropes 47 and 50 to the flexible screen 45 is straight and uniform and since the stitched ropes 47 and 50 are substantialy absolutely parallel, the tubular roller 55 and the tubular suspension slat 82 are maintained in substantially absolutely parallel relation, and, as a result, the flexible screen 45 hangs flat in picture exhibiting position without wrinkles or waves therein and the flexible screen 45 is uniformly tensioned throughout its width. The stitched ropes 47 and 50 form rugged, as well as accurate and inexpensive, anchoring means, between the flexible screen 45 and the tubular roller 55 and the tubular suspension slat 82 which sufficiently withstands the tensioning forces applied to the flexible screen 45.

The form of the invention illustrated in FIGS. 13 to 18 is like the form of the invention illustrated in FIGS. 1 to 12, and like reference characters have been utilized for like parts. The form of the invention illustrated in FIGS. 13 to 18 differs from that of FIGS. 1 to 12 in the manner in which the flexible screen 45 is anchored to the spring biased tubular roller. Here, the tubular roller is designated at 100 and it is provided with a longitudinally extending slot 101, the edges of the longitudinal slot 101 being radially offset, as illustrated in FIGS. 14 and 16, a distance corresponding substantially to the thickness of the flexible screen 45. The ends of the tubular roller 100 are provided with bayonet type slots 102, the outer ends of the slots 102 being open at the ends of the roller 100 and the inner ends of the slots 102 extending toward the longitudinal slot 101.

The first stitched rope 47 and the projecting edge 49 of the flexible screen 45 beyond that stitched rope are longitudinally received in the tubular roller 100 along the slot 101 therein with the flexible screen 45 extending through the slot 101 and anchoring that end of the flexible screen to the tubular roller. The flexible screen 45 cooperates with the slot 101 in the tubular roller 100 through which it extends to present a relatively smooth cylindrical surface upon which the flexible screen is rolled, so that lattice formations are not formed in the flexible screen while rolled on the tubular roller, this relatively smooth cylindrical surface being afforded by the radially offset edges of the longitudinal slot 101. The extending ends of the first stitched rope 47 are received in the bayonet type slots 102 in the roller 100 for stretching and appropriately positioning the first stitched rope 47 and the flexible screen 45 along the tubular roller 100, and spring clips 105 which are extended over the ends of tubular roller 100 clamp the extending ends of the first stitched rope 47 in the bayonet type slot 102 for preventing relative longitudinal movement between the flexible screen 45 and the tubular roller 100, this being illustrated in FIGS. 15 and 17. If desired, the spring clip 105 may be formed integrally with the spider 60.

While for purposes of illustration two forms of this invention have been disclosed, other forms thereof may become apparent to those skilled in the art upon reference to this disclosure and, therefore, this invention is to be limited only by the scope of the appended claims.

The embodiments of the invention in which an exclusive property or privilege is claimed are defined as follows:

1. In a projection screen for exhibiting pictures projected thereon, a flexible screen of rectangular outline, a first rope stitched to one side of the flexible screen adjacent to but spaced from one edge of the flexible screen, a second rope stitched to the same side of the flexible screen adjacent to but spaced from an edge of the flexible screen opposite from said one edge, said stitched ropes being parallel to each other, a tubular roller having a longitudinally extending slot therein of lesser width than the thickness of the first rope, said first rope being longitudinally received in the tubular roller along the slot therein for anchoring that end of the flexible screen to the tubular roller, a tubular suspension slat having a longitudinally extending slot therein of lesser width than the thickness of the second rope, said second rope being longitudinally received in the tubular suspension slat along the slot therein for anchoring that end of the flexible screen to the suspension slat, spring means for rotating the tubular roller for normally rolling the flexible screen onto the tubular roller, said tubular suspension slat when manipulated pulling and unrolling the flexible screen from the tubular roller against the action of the spring means, and mounting means for the tubular roller and the tubular suspension slat for supporting the flexible screen in picture exhibiting position.

2. In a projection screen for exhibiting pictures projected thereon, a flexible screen of rectangular outline, a first rope stitched to one side of the flexible screen adjacent to but spaced from one edge of the flexible screen, a second rope stitched to the same side of the flexible screen adjacent to but spaced from an edge of the flexible screen opposite from said one edge, said stitched ropes being parallel to each other, a tubular roller having a longitudinally extending slot therein of lesser width than the thickness of the first rope, said first rope being longitudinally received in the tubular roller along the slot therein for anchoring that end of the flexible screen to the tubular roller, a tubular suspension slat having a longitudinally extending slot therein of lesser width than the thickness of the second rope, said second rope being longitudinally received in the tubular suspension slat along the slot therein for anchoring that end of the flexible screen to the suspension slat, spring means for rotating the tubular roller for normally rolling the flexible screen onto the tubular roller, said tubular suspension slat when manipulated pulling and unrolling the flexible screen from the tubular roller against the action of the spring means, and mounting means for the tubular roller and the tubular suspension slat for supporting the flexible screen in picture exhibiting position, said mounting means including means for moving apart the tubular roller and the tubular suspension slat to tension, between said first and second ropes, the flexible screen in picture exhibiting position.

3. In a projection screen for exhibiting pictures projected thereon, a flexible screen of rectangular outline, a first rope stitched to one side of the flexible screen adjacent to but spaced from one edge of the flexible screen, a second rope stitched to the same side of the flexible screen adjacent to but spaced from an edge of the flexible screen opposite from said one edge, said stitched ropes being parallel to each other, a tubular roller having a longitudinally extending slot therein of lesser width than the thickness of the first rope, said first rope being longitudinally received in the tubular roller along the slot therein with the flexible screen and the projecting edge thereof beyond the first stitched rope on the outside of the tubular roller for anchoring that end of the flexible screen to the roller, adhesive means for securing the projecting end of the flexible screen beyond the first stitched rope to the outside of the tubular roller, a tubular suspension slat having a longitudinally extending slot therein of lesser width than the thickness of the second rope, said second rope being longitudinally received in the tubular suspension slat along the slot therein for anchoring that end of the flexible screen to the suspension slat, spring means for rotating the tubular roller for normally rolling the flexible screen onto the tubular roller, said tubular suspension slat when manipulated pulling and unrolling the flexible screen from the tubular roller against the action of the spring means, and mounting means for the tubular roller and the tubular suspension slat for supporting the flexible screen in picture exhibiting position.

4. In a propection screen for exhibiting pictures projected thereon, a flexible screen of rectangular outline, a first rope stitched to one side of the flexible screen adjacent to but spaced from one edge of the flexible screen, a second rope stitched to the same side of the flexible screen adjacent to but spaced from an edge of the flexible screen opposite from said one edge, said stitched ropes being parallel to each other, a tubular roller having a longitudinally extending slot therein of lesser width than the thickness of the first rope, said first rope being longitudinally received in the tubular roller along the slot therein with the flexible screen and the projecting edge thereof beyond the first stitched rope on the outside of the tubular roller for anchoring that end of the flexible screen to the roller, a double faced adhesive tape of greater width than the width of the projecting edge of the flexible screen beyond the first stitched rope secured on its inside to the outside of the tubular roller along the longitudinal slot therein, said projecting edge of the flexible screen beyond the first stitched rope being secured to the outside of the double faced adhesive tape and hence to the outside of the tubular roller, a protective film secured to the outside of the double faced adhesive tape and overlying the double faced adhesive tape, the projecting edge of the flexible screen and the stitching of the first rope to the flexible screen, a tubular suspension slat having a longitudinally extending slot therein of lesser width than the thickness of the second rope, said second rope being longitudinally received in the tubular suspension slat along the slot therein for anchoring that end of the flexible screen to the suspension slat, spring means for rotating the tubular roller for normally rolling the flexible screen onto the tubular roller, said tubular suspension slat when manipulated pulling and unrolling the flexible screen from the tubular roller against the action of the spring means, and mounting means for the tubular roller and the tubular suspension slat for supporting the flexible screen in picture exhibiting position.

5. In a projection screen for exhibiting pictures projected thereon, a flexible screen of rectangular outline, a first rope stitched to one side of the flexible screen adjacent to but spaced from one edge of the flexible screen, a second rope stitched to the same side of the flexible screen adjacent to but spaced from an edge of the flexible screen opposite from said one edge, said stitched ropes being parallel to each other, a tubular roller having a longitudinally extending slot therein of lesser width than the thickness of the first rope, said first rope being longitudinally received in the tubular roller along the slot therein for anchoring that end of the flexible screen to the tubular roller, a tubular suspension slat having a longitudinally extending slot therein of lesser width than the thickness of the second rope, said second rope and the projecting end of the flexible screen beyond the second stitched rope being longitudinally received in the tubular suspension slat along the slot therein with the flexible screen extending through the slot therein for anchoring that end of the flexible screen to the suspension slat, spring means for rotating the tubular roller for normally rolling the flexible screen onto the tubular roller, said tubular suspension slat when manipulated pulling and unrolling the flexible screen from the tubular roller against the action of the spring means, and mounting means for the tubular roller and the tubular suspension slat for supporting the flexible screen in picture exhibiting position.

6. In a projection screen for exhibiting pictures projected thereon, a flexible screen of rectangular outline, a first rope stitched to one side of the flexible screen adjacent to but spaced from one edge of the flexible screen, a second rope stitched to the same side of the flexible screen adjacent to but spaced from an edge of the flexible screen opposite from said one edge, said stitched ropes being parallel to each other, a tubular roller having a longitudinally extending slot therein of lesser width than the thickness of the first rope, said first rope being longitudinally received in the tubular roller along the slot therein for anchoring that end of the flexible screen to the tubular roller, a tubular suspension slat having a longitudinally extending slot therein of lesser width than the thickness of the second rope, said second rope and the projecting end of the flexible screen beyond the second stitched rope being longitudinally received in the tubular suspension slat along the slot therein with the flexible screen extending through the slot therein for anchoring that end of the flexible screen to the suspension slat, means secured to the ends of the suspension slat and the ends of the second stitched rope for stretching and positioning the second stitched rope and the flexible screen along the suspension slat, spring means for rotating the tubular roller for normally rolling the flexible screen onto the tubular roller, said tubular suspension slat when manipulated pulling and unrolling the flexible screen from the tubular roller against the action of the spring means, and mounting means for the tubular roller and the tubular suspension slat for supporting the flexible screen in picture exhibiting position.

7. In a projection screen for exhibiting pictures projected thereon, a flexible screen of rectangular outline, a first rope stitched to one side of the flexible screen adjacent to but spaced from one edge of the flexible screen, a second rope stitched to the same side of the flexible screen adjacent to but spaced from an edge of the flexible screen opposite from said one edge, said stitched ropes being parallel to each other, a tubular roller having a longitudinally extending slot therein of lesser width than the thickness of the first rope, said first rope being longitudinally received in the tubular roller along the slot therein with the flexible screen and the projecting edge thereof beyond the first stitched rope on the outside of the tubular roller for anchoring that end of the flexible screen to the roller, adhesive means for securing the projecting end of the flexible screen beyond the first stitched rope to the outside of the tubular roller, a tubular suspension slat having a longitudinally extending slot therein of lesser width than the thickness of the second rope, said second rope and the projecting end of the flexible screen beyond the second stitched rope being longitudinally received in the tubular suspension slat along the slot therein with the flexible screen extending through the slot therein for anchoring that end of the flexible screen to the suspension slat, spring means for rotating the tubular roller for normally rolling the flexible screen onto the tubular roller, said tubular suspension slat when manipulated pulling and unrolling the flexible screen from the tubular roller against the action of the spring means, and mounting means for the tubular roller and the tubular suspension slat for supporting the flexible screen in picture exhibiting position.

8. In a projection screen for exhibiting pictures projected thereon, a flexible screen of rectangular outline, a first rope stitched to one side of the flexible screen adjacent to but spaced from one edge of the flexible screen, a second rope stitched to the same side of the flexible screen adjacent to but spaced from an edge of the flexible screen opposite from said one edge, said stitched ropes being parallel to each other, a tubular roller having a longitudinally extending slot therein of lesser width than the thickness of the first rope, said first rope being longitudinally received in the tubular roller along the slot therein with the flexible screen and the projecting edge thereof beyond the first stitched rope on the outside of the tubular roller for anchoring that end of the flexible screen to the roller, a double faced adhesive tape of greater width than the width of the projecting edge of the flexible screen beyond the first stitched rope secured on its inside to the outside of the tubular roller along the longitudinal slot therein, said projecting edge of the flexible screen beyond the first stitched rope being secured to the outside of the double faced adhesive tape and hence to the outside of the tubular roller, a protective film secured to the outside of the double faced adhesive tape and overlying the double faced adhesive tape, the projecting edge of the flexible screen and the stitching of the first rope to the flexible screen, a tubular suspension slat having a longitudinally extending slot therein of lesser width than the thickness of the second rope, said second rope and the projecting end of the flexible screen beyond the second stitched rope being longitudinally received in the tubular suspension slat along the slot therein with the flexible screen extending through the slot therein for anchoring that end of the flexible screen to the suspension slat, means secured to the ends of the suspension slat and the ends of the second stitched rope for stretching and positioning the second stitched rope and the flexible screen along the suspension slat, spring means for rotating the tubular roller for normally rolling the flexible screen onto the tubular roller, said tubular suspension slat when manipulated pulling and unrolling the flexible screen from the tubular roller against the action of the spring means, and mounting means for the tubular roller and the tubular suspension slat for supporting the flexible screen in picture exhibiting position.

9. In a projection screen for exhibiting pictures projected thereon, a flexible screen of rectangular outline, a first rope stitched to one side of the flexible screen adjacent to but spaced from one edge of the flexible screen, a second rope stitched to the same side of the flexible screen adjacent to but spaced from an edge of the flexible screen opposite from said one edge, said stitched ropes being parallel to each other, a tubular roller having a longitudinally extending slot therein of lesser width than the thickness of the first rope, the edges of the longitudinally extending slot in the tubular roller being radially offset, said first stitched rope and the projecting edge of the flexible screen beyond that stitched rope being longitudinally received in the tubular roller along the slot therein for anchoring that end of the flexible screen to the roller, a tubular suspension slat having a longitudinally extending slot therein of lesser width than the thickness of the second rope, said second rope being longitudinally received in the tubular suspension slat along the slot therein for anchoring that end of the flexible screen to the suspension slat, spring means for rotating the tubular roller for normally rolling the flexible screen onto the tubular roller, said tubular suspension slat when manipulated pulling and unrolling the flexible screen from the tubular roller against the action of the spring means, and mounting means for the tubular roller and the tubular suspension slat for supporting the flexible screen in picture exhibiting position.

10. In a projection screen for exhibiting pictures projected thereon, a flexible screen of rectangular outline, a first rope stitched to one side of the flexible screen adjacent to but spaced from one edge of the flexible screen, a second rope stitched to the same side of the flexible screen adjacent to but spaced from an edge of the flexible screen opposite from said one edge, said stitched ropes being parallel to each other, a tubular roller having a longitudinally extending slot therein of lesser width than the thickness of the first rope, the edges of the longitudinally extending slot in the tubular roller being radially offset, said first stitched rope and the projecting edge of the flexible screen beyond that stitched rope being longitudinally received in the tubular roller along the slot therein for anchoring that end of the flexible screen to the roller, said tubular roller having bayonet type slots in the ends thereof receiving the ends of the first stitched rope, spring clips on the ends of the tubular roller to clamp the ends of the first stitched rope in the bayonet type slots for stretching and positioning the first stitched rope and the flexible screen along the tubular roller, a tubular suspension slat having a longitudinally extending slot therein of lesser width than the thickness of the second rope, said second rope being longitudinally received in the tubular suspension slat along the slot therein for anchoring that end of the flexible screen to the suspension slat, spring means for rotating the tubular roller for normally rolling the flexible screen onto the tubular roller, said tubular suspension slat when manipulated pulling and unrolling the flexible screen from the tubular roller against the action of the spring means, and mounting means for the tubular roller and the tubular suspension slat for supporting the flexible screen in picture exhibiting position.

11. In a projection screen for exhibiting picture projected thereon, a flexible screen of rectangular outline, a first rope stitched to one side of the flexible screen adjacent to but spaced from one edge of the flexible screen, a second rope stitched to the same side of the flexible screen adjacent to but spaced from an edge of the flexible screen opposite from said one edge, said stitched ropes being parallel to each other, a tubular roller having a longitudinally extending slot therein of lesser width than the thickness of the first rope, the edges of the longitudinally extending slot in the tubular roller being radially offset, said first stitched rope and the projecting edge of the flexible screen beyond that stitched rope being longitudinally received in the tubular roller along the slot therein for anchoring that end of the flexible screen to the roller, a tubular suspension slat having a longitudinally extending slot therein of lesser width than the thickness of the second rope, said second rope and the projecting end of the flexible screen beyond the second stitched rope being longitudinally received in the tubular suspension slat along the slot therein with the flexible screen extending through the slot therein for anchoring that end of the flexible screen to the suspension slat, spring means for rotating the tubular roller for normally rolling the flexible screen onto the tubular roller, said tubular suspension slat when manipulated pulling and unrolling the flexible screen from the tubular roller against the action of the spring means, and mounting means for the tubular roller and the tubular suspension slat for supporting the flexible screen in picture exhibiting position.

12. In a projection screen for exhibiting pictures projected thereon, a flexible screen of rectangular outline, a first rope stitched to one side of the flexible screen adjacent to but spaced from one edge of the flexible screen, a second rope stitched to the same side of the flexible screen adjacent to but spaced from an edge of the flexible screen opposite from said one edge, said stitched ropes being parallel to each other, a tubular roller having a lonigtudinally extending slot therein of lesser width than the thickness of the first rope, the edges of the longitudinally extending slot in the tubular roller being radially offset, said first stitched rope and the projecting edge of the flexible screen beyond that stitched rope being longitudinally received in the tubular roller along the slot therein for anchoring that end of the flexible screen to the roller, said tubular roller having bayonet type slots in the ends of the first stitched rope, spring clips on the ends of the tubular roller to clamp the ends of the first stitched rope in the bayonet type slots for stretching and positioning the first stitched rope and the flexible screen along the tubular roller, a tubular suspension slat having a longitudinally extending slot therein of lesser width than the thickness of the second rope, said second rope and the projecting end of the flexible screen beyond the second stitched rope being longitudinally received in the tubular suspension slat along the slot therein with the flexible screen extending through the slot therein for anchoring that end of the flexible screen to the suspension slat, means secured to the ends of the suspension slat and the ends of the second stitched rope for stretching and positioning the second stitched rope and the flexible screen along the suspension slat, spring means for rotating the tubular roller for normally rolling the flexible screen onto the tubular roller, said tubular suspension slat when manipulated pulling and unrolling the flexible screen from the tubular roller against the action of the spring means, and mounting means for the tubular roller and the tubular suspension slat for supporting the flexible screen in picture exhibiting position.

References Cited by the Examiner

UNITED STATES PATENTS

| | | | |
|---|---|---|---|
| 1,443,695 | 1/1923 | McKibbin | 160—24 |
| 2,064,165 | 12/1936 | Johnson | 160—400 X |
| 2,618,333 | 11/1952 | Judd | 160—400 |
| 2,922,471 | 1/1960 | Nicholas | 160—24 |
| 2,939,526 | 6/1960 | Nicholas | 160—24 |
| 2,964,106 | 12/1960 | Nicholas | 160—24 |

FOREIGN PATENTS 5,555  5/1900  Great Britain.

HARRISON R. MOSELEY, *Primary Examiner.*